US011853460B2

(12) United States Patent
Barcellos et al.

(10) Patent No.: US 11,853,460 B2
(45) Date of Patent: Dec. 26, 2023

(54) ENCRYPTED IDENTIFICATION AND COMMUNICATION

(71) Applicant: TIAKI CONNECTING SURVIVORS OF SEXUAL VIOLENCE INCORPORATED, Walnut, CA (US)

(72) Inventors: Luiz E. Barcellos, Walnut, CA (US); Juliette D. Marquis, Sherman Oaks, CA (US)

(73) Assignee: TIAKI CONNECTING SURVIVORS OF SEXUAL VIOLENCE INCORPORATED, Covina, CA (US)

( * ) Notice: Subject to any disclaimer, the term of this patent is extended or adjusted under 35 U.S.C. 154(b) by 334 days.

(21) Appl. No.: 17/054,514

(22) PCT Filed: May 10, 2019

(86) PCT No.: PCT/US2019/031810
§ 371 (c)(1),
(2) Date: Nov. 10, 2020

(87) PCT Pub. No.: WO2019/217879
PCT Pub. Date: Nov. 14, 2019

(65) Prior Publication Data
US 2021/0192077 A1 Jun. 24, 2021

Related U.S. Application Data

(60) Provisional application No. 62/669,678, filed on May 10, 2018.

(51) Int. Cl.
*G06F 21/62* (2013.01)
*G06F 21/31* (2013.01)
(Continued)

(52) U.S. Cl.
CPC .......... *G06F 21/6254* (2013.01); *G06F 21/31* (2013.01); *G06F 21/602* (2013.01); *G06F 21/64* (2013.01)

(58) Field of Classification Search
CPC .... G06F 21/6254; G06F 21/31; G06F 21/602; G06F 21/64
See application file for complete search history.

(56) References Cited

U.S. PATENT DOCUMENTS 9,721,147 B1 8/2017 Kapczynski
9,779,174 B2 * 10/2017 Sheik Adam ....... H04L 63/0407
(Continued)

OTHER PUBLICATIONS

Jones et al., "Protecting victims' identities in press coverage of child victimization". In: Journalism. Jun. 25, 2010, retrieved on Jul. 11, 2019, from <http://unh.edu/ccrc/pdf/CV182.pdf>.
(Continued)

*Primary Examiner* — Stephen T Gundry
(74) *Attorney, Agent, or Firm* — Mintz, Levin, Cohn, Ferris, Glovsky and Popeo, P.C.

(57) ABSTRACT

A system for encrypted identification and communication is provided. In one aspect, a method includes receiving identification information identifying a user, validating an identity of the user, providing an interface for entering an electronic address associated with an accused entity, obtaining additional addresses associated with the accused entity, verifying an identity of the accused entity based on providing the additional addresses to the user, encrypting the addresses, comparing the encrypted data against stored data to identify at least one matched user, and generating a request for the at least one matched user to communicate with the user.

18 Claims, 10 Drawing Sheets

(51) Int. Cl.
*G06F 21/60* (2013.01)
*G06F 21/64* (2013.01)

(56) References Cited

U.S. PATENT DOCUMENTS

| | | | | |
|---|---|---|---|---|
| 2011/0258200 | A1* | 10/2011 | Drummond | G06Q 50/01 709/204 |
| 2012/0311035 | A1* | 12/2012 | Guha | G06Q 50/01 709/204 |
| 2013/0080336 | A1* | 3/2013 | Van Wie | G06Q 30/06 705/80 |
| 2013/0091581 | A1* | 4/2013 | Pirani | G06F 21/31 726/26 |
| 2013/0159836 | A1 | 6/2013 | Ferraro et al. | |
| 2014/0040154 | A1* | 2/2014 | Webb | G06Q 90/00 705/325 |
| 2014/0279579 | A1 | 9/2014 | Huntsman | |
| 2014/0304341 | A1* | 10/2014 | Hsu | H04L 51/08 709/206 |
| 2015/0249584 | A1* | 9/2015 | Cherifi | H04L 43/065 709/224 |
| 2015/0262129 | A1* | 9/2015 | Maynard | G06Q 50/265 705/14.66 |
| 2016/0019362 | A1* | 1/2016 | Leonhardt | G16H 50/30 705/2 |
| 2016/0307286 | A1* | 10/2016 | Miasnik | H04W 4/029 |
| 2017/0163681 | A1* | 6/2017 | Kadashevich | H04L 63/08 |
| 2018/0078188 | A1* | 3/2018 | Kaneko | A61B 5/0205 |
| 2018/0182051 | A1* | 6/2018 | McIntyre | G06Q 50/26 |
| 2019/0102459 | A1* | 4/2019 | Patterson | G06F 40/295 |
| 2019/0132356 | A1* | 5/2019 | Vargas Gonzalez | H04L 63/1425 |
| 2019/0139149 | A1* | 5/2019 | Hong | G06F 40/279 |
| 2019/0149328 | A1* | 5/2019 | Van Der Velden | H04L 9/0877 713/171 |
| 2019/0180245 | A1* | 6/2019 | Weindling | G06Q 10/105 |
| 2020/0258178 | A1* | 8/2020 | Keiser | G06Q 10/00 |
| 2021/0144149 | A1* | 5/2021 | Simons | H04L 9/3239 |
| 2021/0209711 | A1* | 7/2021 | Song | G06Q 40/02 |
| 2021/0234837 | A1* | 7/2021 | Dahan | H04L 63/104 |
| 2021/0286868 | A1* | 9/2021 | Kragh | H04L 63/0823 |
| 2021/0329030 | A1* | 10/2021 | Kedem | H04L 63/1425 |
| 2022/0083978 | A1* | 3/2022 | Weindling | G06Q 10/105 |
| 2022/0108319 | A1* | 4/2022 | Novick | H04W 12/122 |
| 2022/0116736 | A1* | 4/2022 | Williams | G06Q 20/3224 |
| 2022/0159443 | A1* | 5/2022 | Piantedosi | H04W 4/029 |
| 2022/0353632 | A1* | 11/2022 | Williams | A61B 5/165 |
| 2022/0368682 | A1* | 11/2022 | Verzun | H04L 9/50 |
| 2022/0386080 | A1* | 12/2022 | Williams | H04W 4/029 |

OTHER PUBLICATIONS

Weiss, "Neutralizing sexual victimization: A typology of victims' non-reporting accounts". In: Theoretical criminology. May 17, 2016, retrieved on Jul. 11, 2019 from <http://citeseerx.lst.psu.edu/viewdoc/download?doi=10.1.955.5784&rep=rep1&type=pdf> entire document.

* cited by examiner

400

410 Receive identification information identifying a user

420 Validate an identity of the user based on comparing the identification information against first trusted information

430 Provide an interface to the user to enter an electronic address associated with an accused entity

440 Obtain additional addresses associated with the accused entity based on comparing the electronic address against second trusted information

450 Verify an identity of the accused entity by providing the additional addresses to the user

460 Encrypt the electronic address and the additional addresses to generate encrypted data

470 Compare the encrypted data against stored data to identify at least one matched user

480 Generate a request for the at least one matched user to communicate with the user

FIG. 12

ENCRYPTED IDENTIFICATION AND COMMUNICATION

CROSS REFERENCE TO RELATED APPLICATIONS

The current application claims priority to U.S. Provisional Application No. 62/669,678 filed May 10, 2018, entitled ENCRYPTED IDENTIFICATION AND COMMUNICATION, the disclosure of which is incorporated herein by reference in its entirety.

TECHNICAL FIELD

The subject matter described herein relates to encryption algorithms, and more particularly, encrypted identification and communication.

BACKGROUND

Victims of a crime are often too afraid and/or embarrassed to report the crime to the appropriate entity, especially when the victim knows the perpetrator personally and the crime is sexual in nature. For example, reports of criminal activity are susceptible to possession and viewing by people other than the victim. Thus, the identity of the victim, the identity of the accused, and/or the nature of the alleged potentially criminal activity are often not protected by current systems. Additionally, reporting a crime often requires a victim to relive the trauma of a crime in an area that is outside of their comfort zone, such as a police station. Accordingly, current systems place barriers on a victim's proclivity to come forward, increasing the prevalence of unreported and unprosecuted crimes. Accordingly, it can be desirable to provide systems capable of protecting the identification of people involved in a crime and/or allowing a victim to report a crime at a time and location of their choosing.

SUMMARY

Systems, methods, and articles of manufacture, including program products, are provided for encrypting information and/or communication. In one aspect, a method includes receiving identification information identifying a user. The method further includes validating an identity of the user based on comparing the identification information against first trusted information. The method further includes providing, based on the validating, an interface to the user to enter an electronic address associated with an accused entity. The method further includes obtaining, based on comparing the electronic address against second trusted information, additional addresses associated with the accused entity. The method further includes verifying, based on providing the additional addresses to the user, an identity of the accused entity. The method further includes encrypting, when the identity of the accused entity is verified, the electronic address and the additional addresses to generate encrypted data. The method further includes comparing the encrypted data against stored data to identify at least one matched user. The method further includes generating, based on the comparing, a request for the at least one matched user to communicate with the user. The method of claim 11, wherein the first trusted information comprises credit history information, and wherein the first trusted information is provided via a third party.

In optional variations one or more additional features, including but not limited to the following, can be included in any feasible combination. For example, the electronic address and the additional addresses may each include at least one of an email address, a web address, a phone number, a physical address, a GPS location, and a link to a social media account. The method may further include obtaining the additional addresses from a database associating individuals with the additional addresses. Encrypting the electronic address and the additional addresses may include encrypting the electronic address and the additional addresses through the use of a one-way hash. The identity of the user may be anonymous to the at least one matched user. The method may further include providing, when the at least one matched user accepts the request, a communication interface to the user and the at least one matched user. The communication interface may include at least one of an anonymized chat room, an anonymized messaging service, and an anonymized email service. The method may further include generating a report comprising information about at least one of the user, the accused entity, an incident description, and the at least one matched user. The method may further include encrypting the report. The method may further include recording the report in a blockchain.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts an example of a method for encrypted identification and communication, in accordance with some example implementations;

FIG. 5 depicts a user interface for reporting an incident, in accordance with some example implementations;

Figures 7, 8, 9:
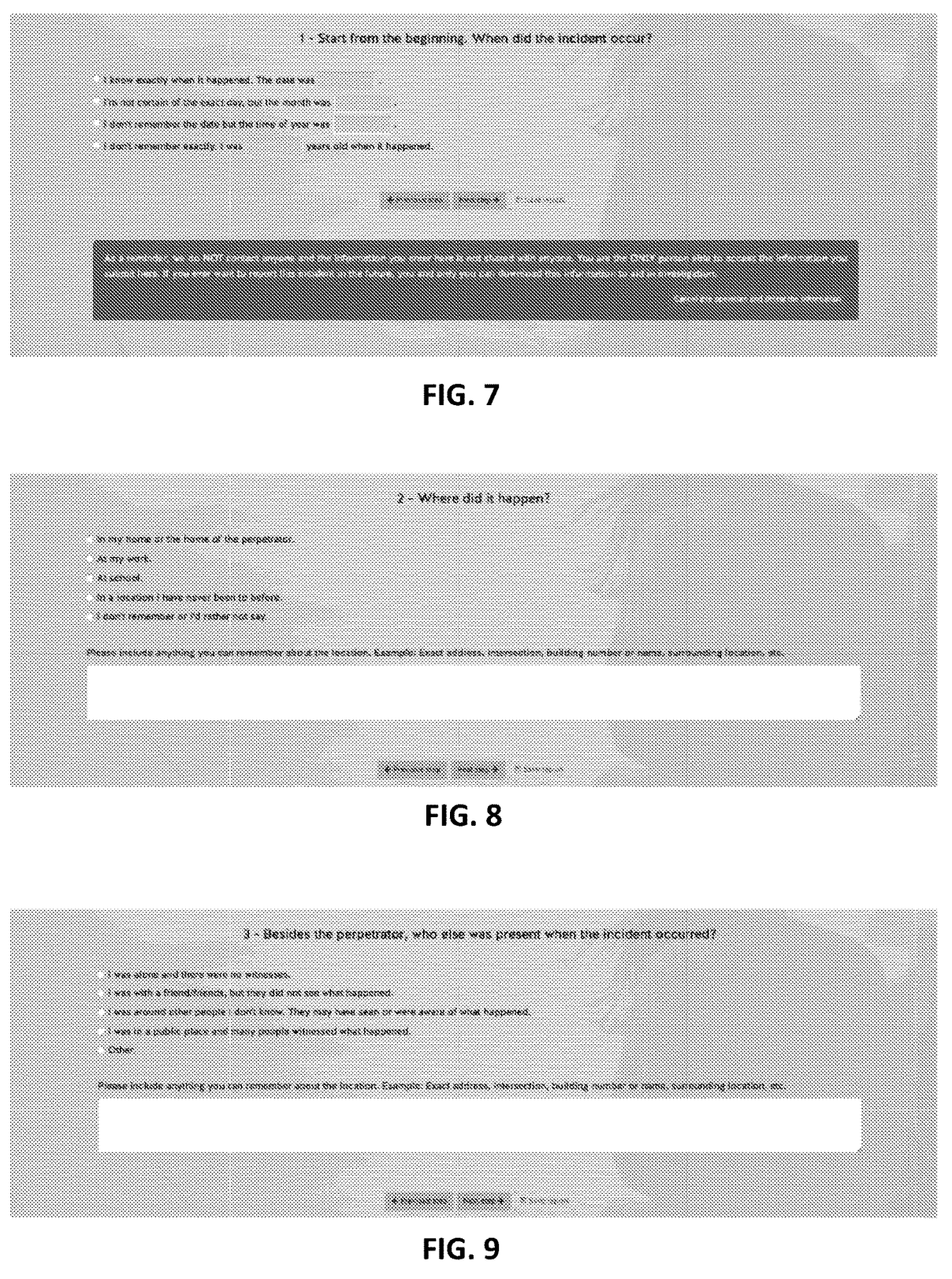

FIG. 7 depicts a user interface for reporting an incident, in accordance with some example implementations;

FIG. 8 depicts a user interface for reporting an incident, in accordance with some example implementations;

FIG. 9 depicts a user interface for reporting an incident, in accordance with some example implementations;

Figures 10, 11, 12:
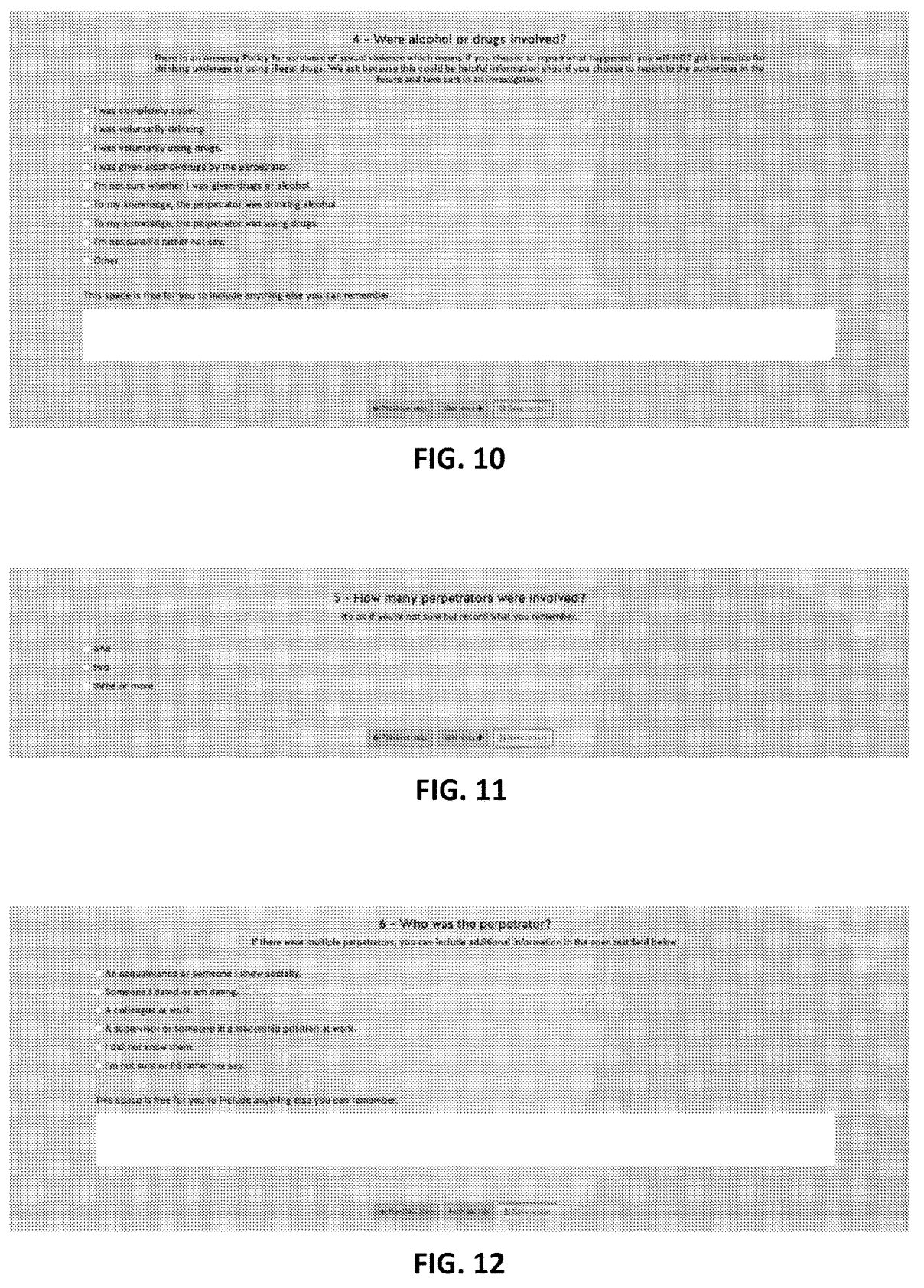

FIG. 10 depicts a user interface for reporting an incident, in accordance with some example implementations;

FIG. 11 depicts a user interface for reporting an incident, in accordance with some example implementations;

FIG. 12 depicts a user interface for reporting an incident, in accordance with some example implementations;

When practical, similar reference numbers denote similar structures, features, or elements.

DETAILED DESCRIPTION

Figure 1:
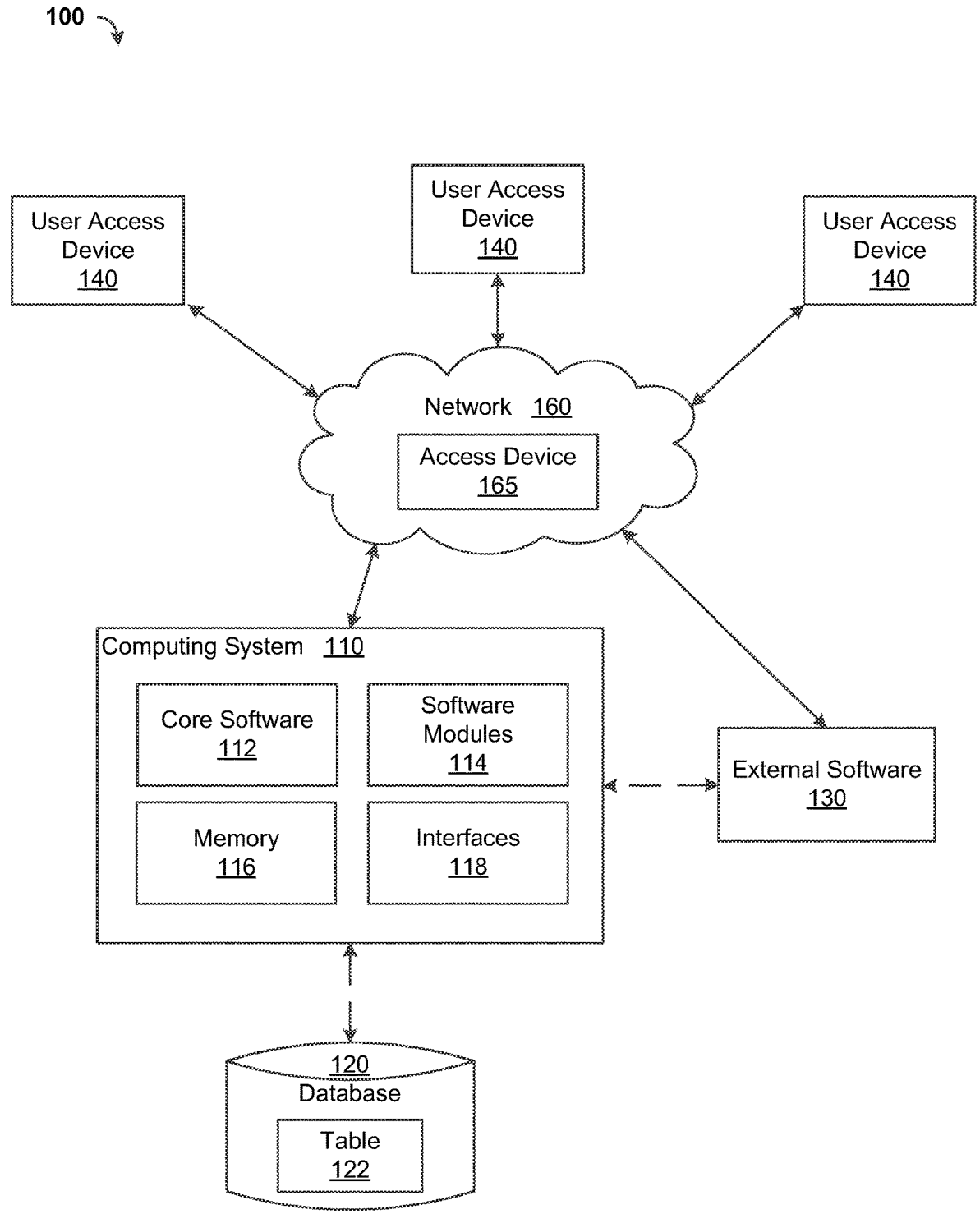
FIG. 1 depicts a block diagram of a system for secure identification and communication, in accordance with some example implementations.

As noted above, victims of a crime are often too afraid and/or embarrassed to report the crime to the appropriate entity, especially when the victim knows the perpetrator personally and the crime is sexual in nature.

Sexual violence can refer to any sexual act or act targeting a person's sexuality, gender identity or gender expression, whether the act is physical or psychological in nature, that is committed, threatened or attempted against a person without the person's consent, and can include sexual assault, sexual harassment, stalking, indecent exposure, voyeurism, sexual exploitation, and/or the like. Reasons someone might not consent may include fear, age, illness, disability, and/or influence of alcohol or other drugs. Anyone can experience sexual violence including children, teens, adults, and elders. Those who commit sexual violence (also sometimes referred to as sexual abusers) may be acquaintances, family members, trusted individuals or strangers. Forms of sexual violence may include rape or sexual assault, child sexual assault and incest, intimate partner sexual assault, unwanted sexual contact/touching, sexual harassment, sexual exploitation, showing one's genitals or naked body, or those/that of another person to someone without the viewer's consent, masturbating in public, watching someone in a private act without their knowledge or permission, and/or the like.

Sexual violence is very common. For example, sexual violence affects people of all genders, ages, races, religions, incomes, abilities, professions, ethnicities, and sexual orientations. However, social inequalities can heighten the risk. By age eighteen, approximately one in four girls will be sexually assaulted, and approximately one in six boys will be sexually assaulted (Finkelhor, Hotaling, Lewis & Smith, 1990). At some time in their lives, approximately one in six women have experienced an attempted or completed rape. More than half of such attacks occurred before the woman was eighteen, and approximately 22% before age twelve (Tjaden & Thoennes, 2000). During their lives, approximately one in thirty three men have experienced an attempted or completed rape. Approximately 75% of such attacks occurred before the men were eighteen, and 48% before age twelve (Tjaden & Thoennes, 2000).

Sexual violence crimes tend to be significantly underreported. For example, only an estimated 344 out of every 1,000 are reported to police. That means about two out of three sexually violent crimes go unreported. Among college-aged victims, female students tend to report only about 20% of such attacks while female non-students report about 32% of attacks. The elderly tend to report at only about a 28% rate. Among members of the military, approximately 43% of female victims reported sexual attacks, but only 10% of male victims reported sexual attacks.

Rape is often considered the least reported and least convicted violent crime in the U.S. There are many reasons why a victim may choose not to report to law enforcement or tell anyone about what happened to them. Some include concern for not being believed, fear of the retaliation from the attacker(s), embarrassment or shame, fear of being blamed, pressure from others not to tell, distrust of law enforcement, belief that there is not enough evidence, desire to protect the attacker, and/or the like. Many reported rapes or sexual assaults do not result in a conviction, or even an arrest of the attacker. For example, the probability of arrest after a report is 50.8% (Reynolds, 1999) and the probability of a reported rapist being sent to prison is 16.3% (Reynolds, 1999).

A variety of rationales for reporting sexual violence crimes to police or other law enforcement officials have been indicated by victims. These include protecting the household or victim from further crimes by the offender (28% of polled victims), stopping the incident or preventing recurrence or escalation (25% of polled victims), improving police surveillance or out of a belief that the victims has a duty to do report (21% of polled victims), catching/punishing/preventing the offender from reoffending (17% of polled victims), and getting help or recovering a loss (3% of polled victims), among others. Separately, victims are more likely to report if they are able to find strength in numbers. Rationales given by victims for not reporting instances of sexual violence crimes to police or other law enforcement include fear of retaliation (20% of polled victims), belief that the police would not do anything to help (13% of polled victims), belief that it was a personal matter (13% of polled victims), reported to a different (non law enforcement) official (8% of polled victims), belief that it was not important enough to report (8% of polled victims), a desire to avoid getting the perpetrator in trouble (7% of polled victims), and belief that the police could not do anything to help (2% of polled victims), and others.

Sexual violence victims usually know their assaulter. People who sexually assault usually attack someone they know, such as a friend, classmate, neighbor, coworker, or relative. In some studies of adult victims of sexual violence crimes, 73% knew the attacker, 38% were friends of the attacker, 28% were an intimate partner of the attacker, and 7% were a relative of the attacker (Maston & Klaus, 2005). In other studies, child victims knew the offender before the attack 90% of the time (Greenfeld, 1996). According to some studies, about 40% of sexual assaults take place in the victim's own home, while another 20% occur in the home of a friend, neighbor, or relative (Greenfeld, 1997). Further, other studies have found that approximately 93% of juvenile victims knew the perpetrator in sexual abuse cases reported to law enforcement, where 59% were acquaintances and 34% were family members.

Accordingly, systems are provided herein for securely and anonymously identifying people involved in potentially criminal activity (e.g., acts of sexual violence), securely and anonymously connecting victims of potentially criminal activity, and/or securely and anonymously allowing victims to report potentially criminal activity at times and locations of their choosing. As used herein, "reporting" criminal activity can refer to a user and/or a computing system generating a report that includes details about alleged criminal activity, generating a record indicating that an incident occurred, and/or providing the report and/or incident record to an entity (e.g., an entity outside of the computing system and/or the user).

FIG. 1 illustrates a functional block diagram of a system 100 in which features consistent with the described subject matter may be implemented.

As illustrated, the system 100 can include a computing system 110 capable of communicating with one or more user access devices 140, external software 130, and/or one or more databases 120. In some aspects, the computing system can utilize one or more interfaces 118 for communication. Communication among the devices in the system 100 can be through the use of direct communications, such as through the use of a wireless connection like Bluetooth, near-field communication (NFC), ZigBee, WiFi, some combination thereof, and/or the like. Additionally or alternatively, communication among the devices in the system 100 can be through the use of a hard wire connection such as universal serial bus (USB) and/or the like. Communication can additionally or alternatively occur through indirect communications, such as over a network 160, which can include a local area network, a wide area network, a wireless network, the Internet, some combination thereof, and/or the like.

Communication over the network 160 can utilize a network access device 165, such as a base station, a Node B, an evolved Node B (eNB), an access nodes (ANs), a hotspot, and/or the like. In some aspects, any of the user access device 140 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, Internet of Things (IoT) devices, smart home devices, and/or the like. Wired or wireless communication among the computing system 110, user access devices 140, eternal software, and/or databases 120 can occur according to various protocols and/or access technologies (e.g., Global System for Mobile Communication (GSM), Universal Mobile Telecommunications System (UMTS), technologies developed by IEEE such as WiFi and/or Bluetooth, technologies developed by the Third Generation Partnership Project (3GPP) or 3GPP2 such as Long Term Evolution (LTE) and/or CDMA2000, etc.).

As illustrated, the computing system 110 can include core software 112 and/or one or more software modules 114. The core software 112 can provide one or more features of a high-level programming software system. The software modules 114 can provide more specialized functionality. For example, the core software 112 and/or software modules 114 can provide database management and/or data anonymization features. In some aspects, the core software 112 or other similar software/hardware can be capable of accessing a database layer, such as within a database 120, including at least one table 122 having at least one column/row of data. The database table 122 can store any kind of data, potentially including but not limited to encrypted and/or hashed personal information. In some implementations, the database table 122 can include reports, user information, metadata, master data, and/or the like.

In some aspects, the core software 112 can be configured to load the information from the database 120 to memory 116 (e.g., main memory) in response to receipt of a query instantiated by a user or computer system through one or more user access devices 140, the external software 130, and/or the like. Although the database 120 is illustrated as being separate and, at times, described as being separate from the computing system 110, in various implementations, at least a portion of the database 120 can be located within the computing system. The database 120 may be a column store database and/or the computing system 110 may be configured to perform OLTP (online transaction processing) and/or OLAP (online analytical processing), which can include complex analytics and tasks.

In some aspects, one or more of the software modules 114 can be configured to utilize data stored in the memory 116, data stored in the database 120, and/or data otherwise accessible to the computing system 110. As further illustrated, the computing system 110 can be capable of utilizing external software 130. In some aspects, the external software 130 can provide additional functionalities or services which may not be available at the computing system 110. In some aspects, the external software 130 may include one or more services available from outside vendors (e.g., credit monitoring services, data tracking services, investigative services, etc.) and/or cloud services. In some aspects, the computing system 110 can provide a platform and/or gateway via which users can access functionality provided the external software 130. In some implementations, the database 120 and/or the external software 130 can be located across one or more servers, and/or communication among the computing system 110, the database, and/or the external software 130 can occur over the network 160.

At least a portion of the illustrated system 100 may include hardware and/or software that interacts with a database, users, and/or other software applications for defining, creating, and/or updating data, for receiving and/or executing database queries, and/or for running software/applications (e.g., software modules 114, and/or external software 130) which utilize a database. In some aspects, the database 120 can be a structured, organized collection of data, such as tables, queries, reports, media, and/or the like, which may be processed for information. The database 120 may be physically stored in a hardware server or across a plurality of hardware servers. In some aspects, the system 100 may be implemented as a cloud-based system.

Figure 2:
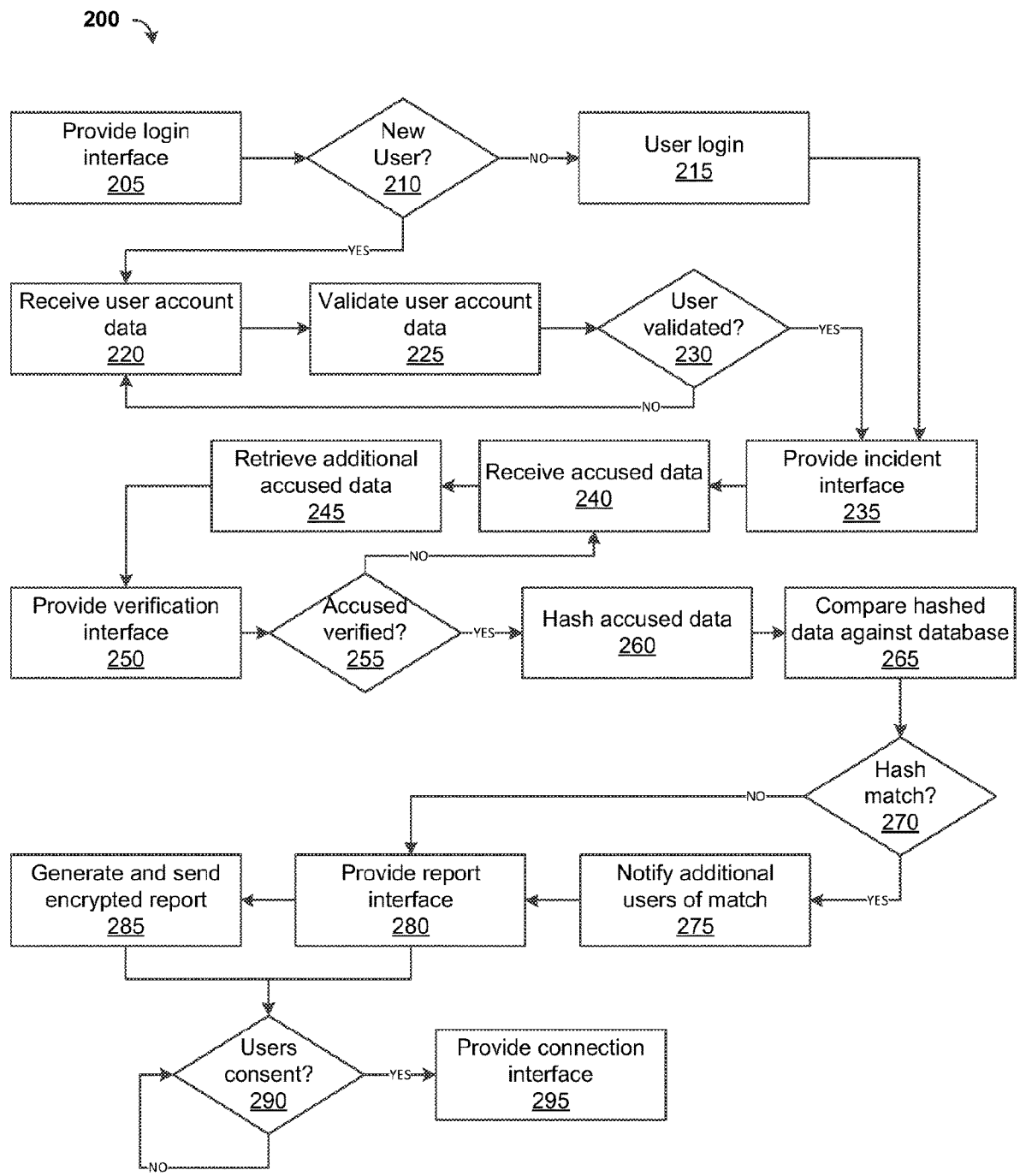
FIG. 2 depicts a flowchart of an example method for anonymously and securely reporting potentially criminal activity, in accordance with some example implementations.

FIG. 2 depicts a flowchart of an example method 200 for anonymously and/or securely reporting potentially criminal activity, in accordance with some example implementations. In some aspects, at least a portion of the method 200 can be performed through the use of a web-based interface, a dedicated application such as a smartphone application, and/or the like. For example, at least a portion of the method 200 can be performed through the use of a system provided by an incident reporting service, which can be similar to the computing system 110 of FIG. 1.

Method 200 can start at operational block 205, where the system can provide a login interface. In some aspects, the login interface can allow a user to login to the system and/or create an account for logging into the system. Method 200 can next proceed to decision block 210, where the system can determine whether the user is a new user. For example, if the user selects an available option to create a new account, then the user can be regarded as a new user. Additionally or alternatively, if the user enters a username, password, and/or other security credential (such as an authentication token) for an existing account, then the user can be regarded as an existing user.

If, at decision block 210, it is determined that the user is not a new user, then method 200 can proceed to operational block 215, where the system can log the user in to use the system. In order to log a user into the system, the system may compare a username and/or password entered by the user against user records stored in a database to determine whether there is a match. If both the username and the password match a record within the database, then the user may be logged into the system. If there is not a match, then the user may be asked to try to login again. Once logged in, method 200 can proceed to operational block 235.

If, at decision block 210, it is instead determined that the user is a new user, then method 200 can alternatively proceed to operational block 220, where the system can receive user account data. In some implementations, the user account data can be received through providing an interface to a user that prompts and allows the user to enter various pieces of information. The information requested from a user can be any number of: an email address, a username (which can be an email address), a first name, a middle name or initial, a last name, a social security number, billing information (e.g., at least a portion of an address), a date of birth, and/or the like. In some implementations, the user may be asked to log into the account associated with the email address to verify that the email address is active and/or controlled by the user.

Method 200 can then proceed to operational block 225, where the system can validate the user account data. In some aspects, validating the user account data can refer to determining whether the user entering the user account data is the same as the person identified by the user account data. In some aspects, it can be beneficial to verify that a user is who they say they are in order to prevent malicious users from abusing the system. However, in some implementations, a user may be able to create an account without validation (e.g., account creation and account validation can be separate steps).

In order to validate the user, at least a portion of the user account information received at operational block 220 can be verified against trusted information. Trusted information can be maintained within the system or outside of the system. For example, in some implementations, the system can provide at least a portion of the user account data to a service provider for verification. In some aspects, the service provider can be a credit bureau such as Experian, Equifax, or TransUnion, a credit reporting agency, a credit card provider, an identity verification service, and/or the like. In order to validate a user, the service provider can check whether the information provided by a user (e.g., a first name, a middle name or initial, a last name, a social security number, billing information (e.g., at least a portion of an address), a date of birth, and/or the like) matches its own records and/or may ask the user to answer one or more security questions, such as security questions associated with the person identified by the user account data.

In some implementations, in order to provide security and/or trust to a user, the system may display a secure user interface to collect data from the service provider inside of a user interface provided by the system. In some aspects, user input provided within the secure user interface is kept away from the system. For example, the system may be prevented from obtaining any of the information entered into the secure user interface. In some implementations, the system can be prohibited from accessing certain information through the use of Transport Layer Security (TLS), Secure Sockets Layer (SSL), other cryptographic protocol(s), and/or the like. In other implementations, the secure user interface can be generated and/or provided by the system that provides information to the service provider via an application programming interface (API) call, and the data passing through the system may only be stored for the amount of time necessary to relay the information to the API. In various implementations, data can be transmitted between the system and the service provider through a secure protocol such as Hypertext Transfer Protocol Secure (HTTPS).

In some implementations the system may provide an explanation to the user that the user account data they are entering is not recorded by the system, and is instead provided to a trusted service provided for validation purposes only.

If a service provider is used for validation, the system may receive at least a portion of the user account data and/or validation information directly from the service provider. In some implementations, the portion of the user account data that the service provider provides to the system can include the first name entered, the last name entered (or just the first letter to help preserve anonymity), the state entered, the date of birth entered (e.g., for age verification), and/or the like. In some aspects, validation information can include a numerical indication of a level of trust that the service provider has regarding whether the user is the same as the person identified by the user account data.

In some implementations, a subset of the user account data entered by the user might be directly accessible to the system. For example, the user interface provided to the user as part of operational block 220 may have certain fields that are only accessible to an outside service provider (e.g., social security number), certain fields that are only accessible to the system (e.g., email address), and/or certain fields that are accessible to both (e.g., first name). In some implementations, the system can provide separate user interfaces (e.g., concurrently or sequentially) to obtain different portions of the user account data.

Method 200 can proceed to decision block 230, where the system can determine whether the user was successfully validated. In some implementations, a user may be regarded as validated if a numerical indication of the level of trust in the user (e.g., received from a service provider and/or calculated by the system) is at or above a predetermined threshold. Additionally or alternatively, a user may be regarded as not validated if a numerical indication of the level of trust in the user is at or below a predetermined threshold. If the user cannot be regarded as validated, then method 200 can return to operational block 220, where the user may attempt reenter user account data.

If, instead, it is determined that the user is validated, then method 200 can proceed to operational block 230, where the system can provide an incident interface. In some aspects, the incident interface can include a virtual dashboard where the user may be provided with a plurality of options to choose from. In some aspects, the dashboard can provide options for a user to generate new incident records, review and/or revise previously generated incident records, generate new reports, review and/or revise previously generated reports, review and/or send messages to other users, and/or the like. As used herein, an incident record can generally refer to a stored indication that a person was identified by a user as having engaged in potentially criminal activity. As used herein, a report can generally refer to detailed information regarding potentially criminal activity.

Figure 5:
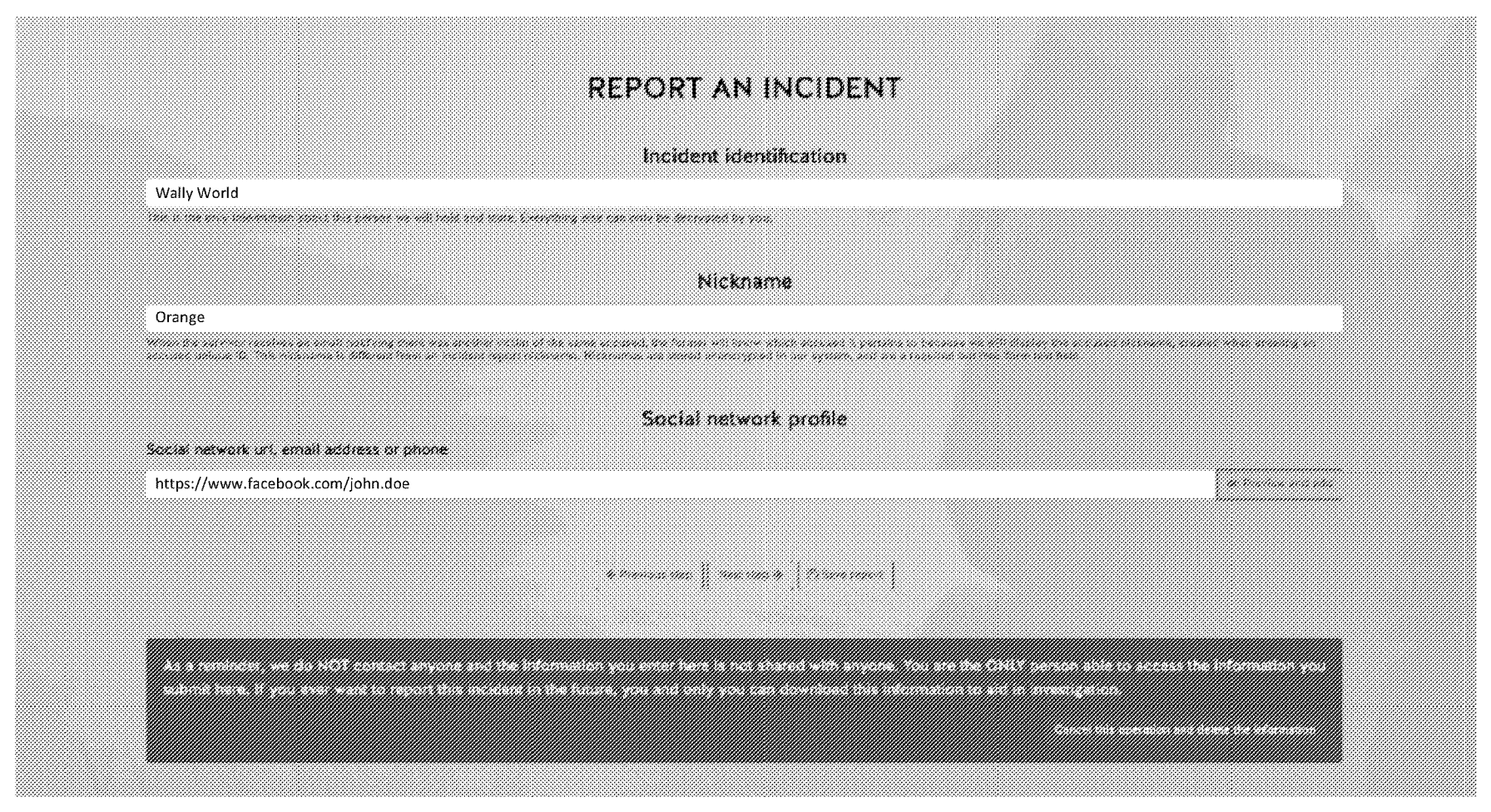

In some implementations, as part of operational block 235, the system can provide the user with one or more fields for entering one or more electronic address associated with an accused. In some implementations, the incident interface provided as part of 235 can be similar to the user interface of FIG. 5. In some aspects, an electronic address can include an email address, a username for a particular electronic service (e.g., an Instagram handle), a uniform resource locator (URL) of a particular web page about a person (e.g., a Facebook profile page), a telephone number, and/or the like. In some aspects, the user can be allowed to enter multiple electronic addresses within the same field (e.g., separated by commas or semicolons) or within separate fields. For example, a user interface may include predefined fields for each social network electronic address acceptable by the system.

Method 200 can proceed to operational block 240, where the system can receive accused data, such as through a user submitting the accused data using the incident interface. In some implementations, the accused data includes all (or at least some) of the electronic addresses provided by the user. In some aspects, the system can attempt to validate the electronic addresses by determining whether the format of the electronic address(es) are proper.

Once the accused data is received, method 200 can proceed to operational block 245, where the system can retrieve additional accused data. In some aspects, the received accused data from operational block 240 can be leveraged to obtain the additional accused data by comparing the received accused data against a trusted resource. In some implementations, the trusted resource can include a service provider maintaining database(s) which retain information about people, including their electronic addresses. For example, in some implementations, a user may provide a URL for an accused's Facebook profile, which the service provider can compare against database(s) they maintain to identify a person with which the URL is associated. If the service provider has additional electronic addresses for the person, then these additional electronic addresses can be provided to the system as part of operational block 245.

Similar to the interface for the user account data provided in operational block 220, the interface provided in operational block 240 can include a secure user interface for the service provider and a user interface provided by the system, which may be prevented from accessing at least a portion of the information entered into the secure user interface and/or may only store the information entered for the amount of time required to transmit the information to the service provider. Also similar to above, the user can be provided with a complete explanation of what information is needed, why the information is needed, what the system will do with the information, whether or not the information is accessed and/or stored by the system, and/or the like.

Figure 6:
FIG. 6 depicts a user interface for confirming the identity of an accused, in accordance with some example implementations.
Figure 13:
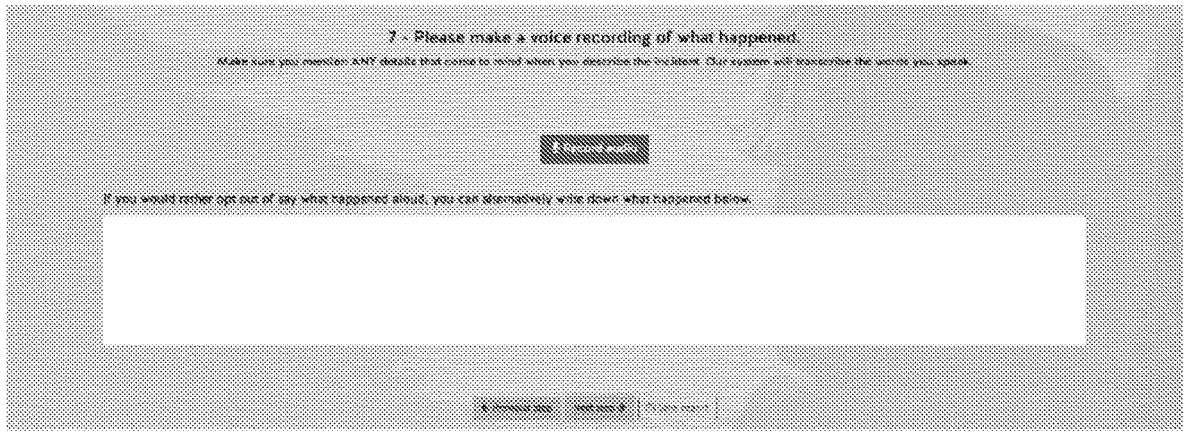
FIG. 13 depicts a user interface for reporting an incident, in accordance with some example implementations.
Figure 14:
FIG. 14 depicts a user interface for reporting an incident, in accordance with some example implementations.
Figure 15:
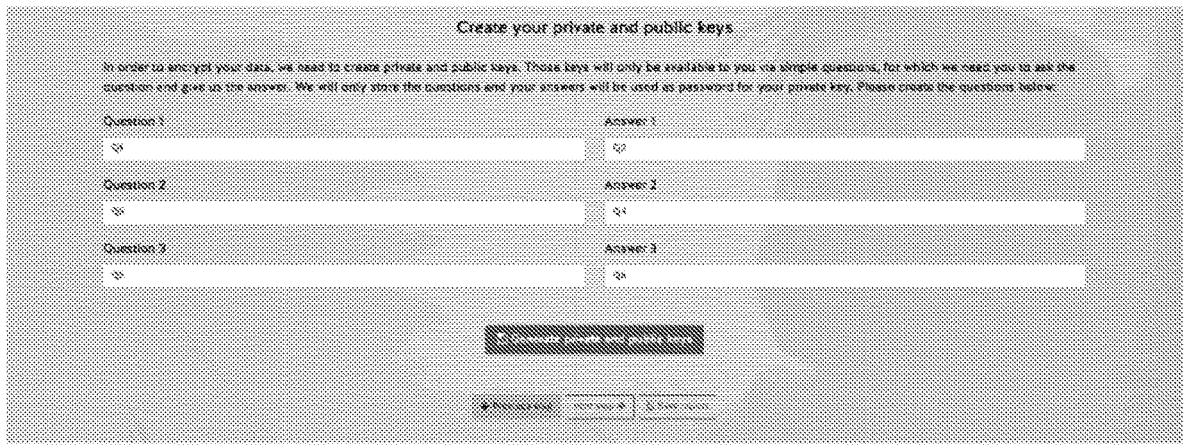
FIG. 15 depicts a user interface for encrypting an incident report, in accordance with some example implementations.
Figure 16:
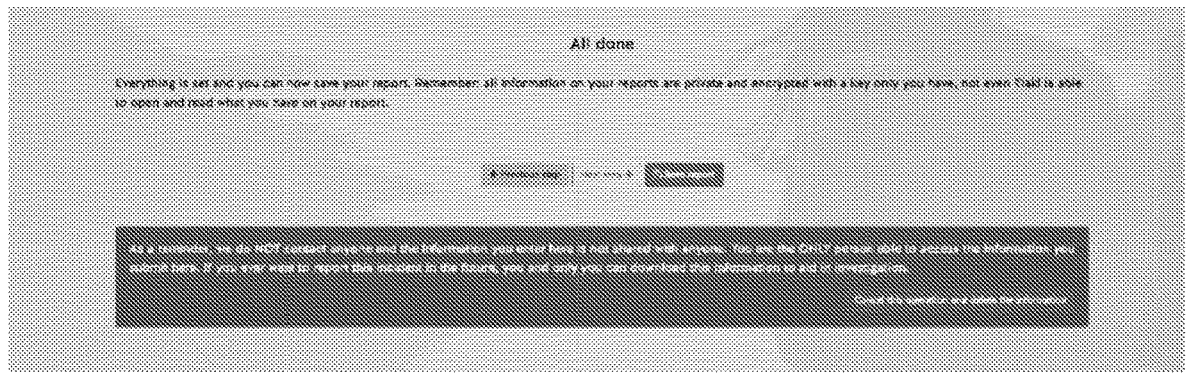
FIG. 16 depicts a user interface for encrypting an incident report, in accordance with some example implementations.
Figure 17:
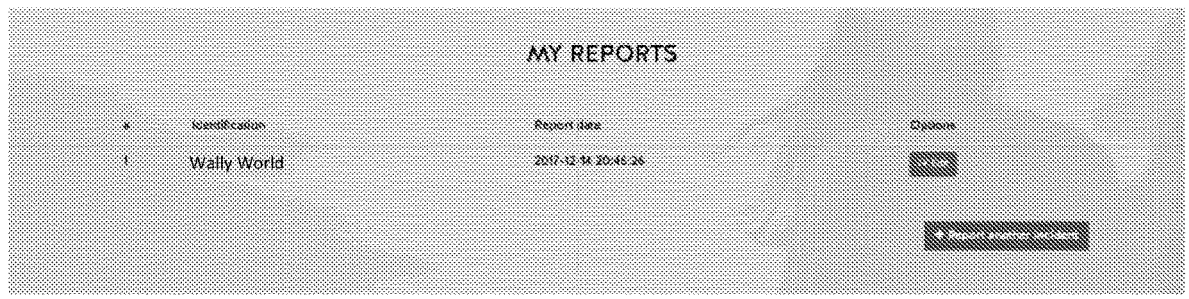
FIG. 17 depicts a user interface for reviewing an incident report, in accordance with some example implementations.

Once the user provides accused data and/or the system retrieves additional accused data, method 200 can proceed to operational block 250, where the system can provide a verification interface to the user. In some implementations, the verification interface provided as part of 250 can be similar to the user interface of FIG. 6. In some implementations, the verification interface can display a list of electronic addresses provided by the user in operational block 240, a list of additional electronic addresses retrieved in operational block 245, and/or a user-selectable object (e.g., a button) for the user to proceed. The verification interface can provide an explanation to the user that they should review each of the electronic addresses (e.g., obtained as part of operational blocks 240 and/or 245) to determine whether the person associated with each of the electronic addresses is the person the user was attempting to identify. Each of the electronic addresses can be displayed in hyperlinked format so that the user can easily click on the hyperlinks and review the associated information. In some aspects, the user can be allowed to select a subset of the electronic addresses which they are confident are associated with the person they are attempting to identify and/or a subset of the electronic addresses which they are not confident are associated with the person. In some implementations, the system can provide an interface for receiving accused data, retrieving accused data, and/or verifying accused data through an API for a web browser.

Method 200 can proceed to decision block 255, where the system can determine whether the accused was verified. In some aspects, the accused can be regarded as verified if the user selects a button indicating that the person identified by the electronic addresses is the person the user is accusing of engaging in potentially criminal activity. Similarly, the accused can be regarded as not verified if the user selects a button indicating that the person identified by the electronic addresses is not the person the user is accusing of engaging in potentially criminal activity.

If the accused is not regarded as verified, then method 200 can return to operational block 240. If the accused is instead regarded as verified, then method 200 can instead proceed to operational block 260, where the system can hash the accused data. In some aspects, hashing the accused data can refer to processing at least a portion of the accused data with a hashing algorithm to generate an output that is different from the input. For example, in some implementations, each of the electronic addresses received during operational blocks 240 and/or 245 can be individually hashed to generate a hashed value (e.g., an alphanumeric string) for each electronic address. Each of the hashed values can be associated with a unique identifier for the accused and/or stored within a database. In some aspects, the unique identifier has no relation to the underlying data, and/or may only be used to associate related hashed values together. For example, the first accused person tracked by the system can be assigned the identifier '1', which can be associated with each of the hashed values. A row of data can be added to a database, indexed by the unique identifier and/or including cells for each of the hashed values associated with the accused.

In some implementations, the hashed values may be stored by the system while the electronic addresses themselves are not stored by the system. This separation of data can help to secure the system from malicious users, which generally cannot ascertain the identity of an accused by simply obtaining the stored hashed values. In some aspects, the hashed values generally cannot be reversed to ascertain the original information (e.g., an electronic address of an accused) processed with the hashing algorithm. This can be referred to as one-way hashing. In some aspects, one-way hashing can even prevent an operator of the system from ascertaining the original information. In some implementations, a SHA (Secure Hash Algorithm) cryptographic hash algorithm such as SHA-256 can be used, which can generate a generally unique and fixed size 256-bit (32-byte) hash. Although hashing is illustrated and described, other techniques for anonymizing the accused data can be used, such as keyed encryption.

Once the hashed accused data is generated, method 200 can proceed to operational block 265, where the system can compare the hashed accused data against currently stored hashed data. If the accused data is hashed with the same algorithm as the stored data, then a match between the sets of data can indicate that the original information (e.g., electronic address) was the same. Thus, the system can compare (e.g., using a string comparison) each of the hashed values generated at operational block 260 against each of a plurality of stored hashed values until a match is found or all data is exhausted. Method 200 can proceed to decision block 270, where the system can determine if there was a match between any of the hashed values generated at operational block 260 and the stored hashed values.

If a match is found at decision block 270, then method 200 can proceed to operational block 275, where the system can notify additional users of a match. For example, in the event a first user has already accused a person with the identifier '1' of engaging in potentially criminal activity and then a second user accuses the same person of engaging in potentially criminal activity, then the system may notify one or both of the users (e.g., based on a match of one or more hashed values associated with the person with the identifier '1') that another user has accused the person of engaging in potentially criminal activity. The notification can include information about the other user, such as a first name, age, and/or state of residence, which was already verified through the system (e.g., by an outside vendor). Additionally or alternatively, the notification (e.g., an email) can provide users with an interface to connect with each other. For example, the notification can generally identify the other user that accused the same person, and ask if the user would like to connect with the other user. In some implementations, users may be allowed to opt out of notifications, but may be opted into receiving notifications by default. In some implementations, one-layer or two-layer proxy emails can be utilized to preserve anonymity (e.g., by not displaying a user's actual email address for an initial communication between two or more users who have accused the same person).

Method 200 can proceed to decision block 290, where the system can wait until both users consent to connecting with each other. If and when both users consent, method 200 can proceed to operational block 295, where the system can provide a communication interface for the users to communicate with each other. In some implementations, the communication interface can be an anonymous chat room, messaging service, email service, and/or the like which does not reveal any personal information about the users. In some implementations, the communication interface may generate and/or send (or cause another system to generate and/or send) an email, to an email address associated with a user who has reported potentially criminal activity, without storing the email or any information about the email. Messages sent using the communication interface may be encrypted. Such procedures can help to preserve anonymity. Once the users are connected, they may anonymously exchange messages with each other as victims of the same perpetrator to provide emotional support, corroborate stories, eventually meet or connect outside of the system, and/or hopefully gain enough confidence to report incidents to the appropriate authority in each case, together or separately. This interaction can be similar to support groups, but done from the victim's own safe space, at their own pace, on their own time and/or in a group in which each peer was a victim of the same perpetrator.

If a match is not found at decision block 270, then method 200 can instead proceed to operational block 280, where the system can provide a report interface to the user. In some implementations, the report interface(s) provided as part of 280 can be similar to the user interfaces of FIG. 7-17. In some aspects, the report interface can prompt a user to generate a report of the alleged potentially criminal activity for safekeeping. Although the system may allow users to utilize the system without generating a report, the system can explain the reporting procedure to the user, explain the benefits to the user, and/or provide the user with options to generate a report or bypass the report. If the user elects to bypass the report, then method 200 can proceed to operational block 290.

In some implementations, the report interface provided at operational block 280 can include fields for the user to enter information regarding when (e.g., time and/or date) the alleged potentially criminal activity occurred, what happened (e.g., an incident type such as rape, unwanted touching, threats, stalking, robbery, assault, battery, bullying, arson, and/or the like), and where (e.g., global positioning system (GPS) coordinates, street address, and/or the like). Although text fields may be provided, an interface for recording audio can additionally or alternatively be provided.

In some aspects, the system may be prevented from accessing reports and/or report drafts in their unencrypted form. For example, once the user is ready to submit their report, method 200 can proceed to operational block 285, where the system can prompt the user to secure their report with a pass phrase. The system can then encrypt the report, including all of the information provided by the user, using the pass phrase and/or store the encrypted report within a database. A time stamp of the encryption time can be recorded and/or associated with the encrypted report. In some implementations, the stored reports can be indexed by an identifier of the accused, an identifier associated with the user that generated the report, a nickname created by the user for the accused, the time stamp, and/or the like. In some aspects the nickname created by the user can be an alphanumeric value (e.g., nonce word) that the user may use later to remember which accused person is associated with the report. However, in some implementations, if a user attempts to use personally identifiable information associated with the accused (e.g., first name, last name, social media username, email, and/or the like) as a nickname for a report, then the system may block the user from doing so (e.g., and/or prompt the user to pick another nickname).

In some aspects, the system does not store the pass phrase, such that the contents of the encrypted report are only accessible to the user. In some aspects, this procedure can be referred to as zero-knowledge encryption. As part of operational block 285, the report can be first encrypted locally at a user access device and then transmitted to the system for storage. In some implementations, the system can provide the report interface and/or encryption procedures through a web browser.

Additionally or alternatively, as part of operational block 280, the system may allow a user to store a draft of their report locally on their user access device (e.g., within a web browser), rather than within the system itself. This procedure can help keep unencrypted (e.g., plain text) information outside of the system and/or allow a user to complete the report completely on their own time.

In some implementations, an encrypted report can be stored locally on a user access device, such as within a browser. If a user wishes to add to a completed report (e.g., report additional potentially criminal activity perpetrated by the same accused as before), then the system can retrieve a copy of the encrypted report created by the user for the accused. Retrieving the copy can involve the system comparing a time stamp for the local report against a time stamp for a version of the report stored in the database and/or selecting the report with the most recent time stamp. In some aspects, a user can supplement their report by adding more information, but may not be permitted to change existing information in an encrypted report. Once the supplement to an encrypted report is completed, the user may encrypt the supplement using a pass phrase (e.g., the same pass phrase for all reports or another pass phrase for each report) and/or the encrypted supplement can be associated and/or stored with the encrypted report within the system. If a user decides to formally report the accused, the user can retrieve their report(s), decrypt their reports, and/or print their reports for reference and/or submission to the appropriate authority. In some implementations, the time stamp for the generation of the report can be included for evidentiary reasons. In some implementations, the system may continually remind users that the system is not an official reporting system, and that an official report may be the only way to truly stop an offender.

In some implementations, blockchain technology can be leveraged to provide additional functionality, security, and/or trust to the systems described herein. For example, in some aspects, encrypted files such as the encrypted reports can be distributed, indexed, linked, and/or the like to provide a blockchain of trusted (e.g., verifiable) files for the system. In some aspects, the verifiability of the reports can be beneficial in the event a user would like to rely upon their reports as evidence, such as in a criminal or civil proceeding. In some aspects, the systems described herein can include and/or be configured to leverage content-addressable, peer-to-peer systems for storing and/or sharing data and/or media in a distributed manner, such as systems using an InterPlanetary File System (IPFS) protocol and/or the like.

In some implementations, one or more of the interfaces described herein can be web-based interfaces provided by the computing system 110 to be displayed on a user access device 140. In some aspects, one or more of the interfaces can be implemented according to hypertext markup language (HTML) protocols, PHP protocols, Python protocols, Ruby protocols, JavaScript protocols, Java protocols, and/or the like.

Although various user interfaces are described herein with respect to a user access device 140, additional or alternative devices can provide the same or similar user interfaces, such as the computing system 110, external software 130, and/or the like. Similarly, although some of the user interfaces described herein may function based on execution of software installed on a user access device 140, at least a portion of the functionality of the user interfaces can be controlled and/or aided by another device (e.g., as a backend), such as the computing system 110, some portion of the computing system 110, another entity in communication with the computing system 110, another user access device 140, and/or the like.

In various implementations, one or more of the user access device(s) 140, the computing system 110, and/or the like can be configured for generating a user interface, such as the user interfaces illustrated and/or described. For example, in some aspects, the user access device 140 can be configured to execute code (e.g., stored in memory) to generate and/or provide (e.g., display) a user interface similar to the user interface illustrated in one or more of FIGS. 6-17. Generating and/or providing the user interface can include displaying information retrieved from a database or an external source, such as the database 120 and/or the external software. Additionally or alternatively, generating and/or providing the user interface can include displaying fields for user entry of data and information associated with the fields, such as an indication of what information belongs in the fields, an indication of whether a field is required (e.g., optional), and/or the like.

Additionally or alternatively, generating and/or providing the user interface can include displaying user-selectable buttons (e.g., illustrated as "Previous Step", "Next Step", Save Report", and/or the like). In response receiving a user selection of a displayed button, the user access device 150A can process the information, provide the information to another device for validation, generate and/or display another user interface, and/or the like. For example, if a user selects the "Next Step" button without completing required fields, the user access device may identify this condition and direct the user to an interface (e.g., the same interface but with additional and/or alternative information) explaining what the user must to do proceed.

Figure 3:
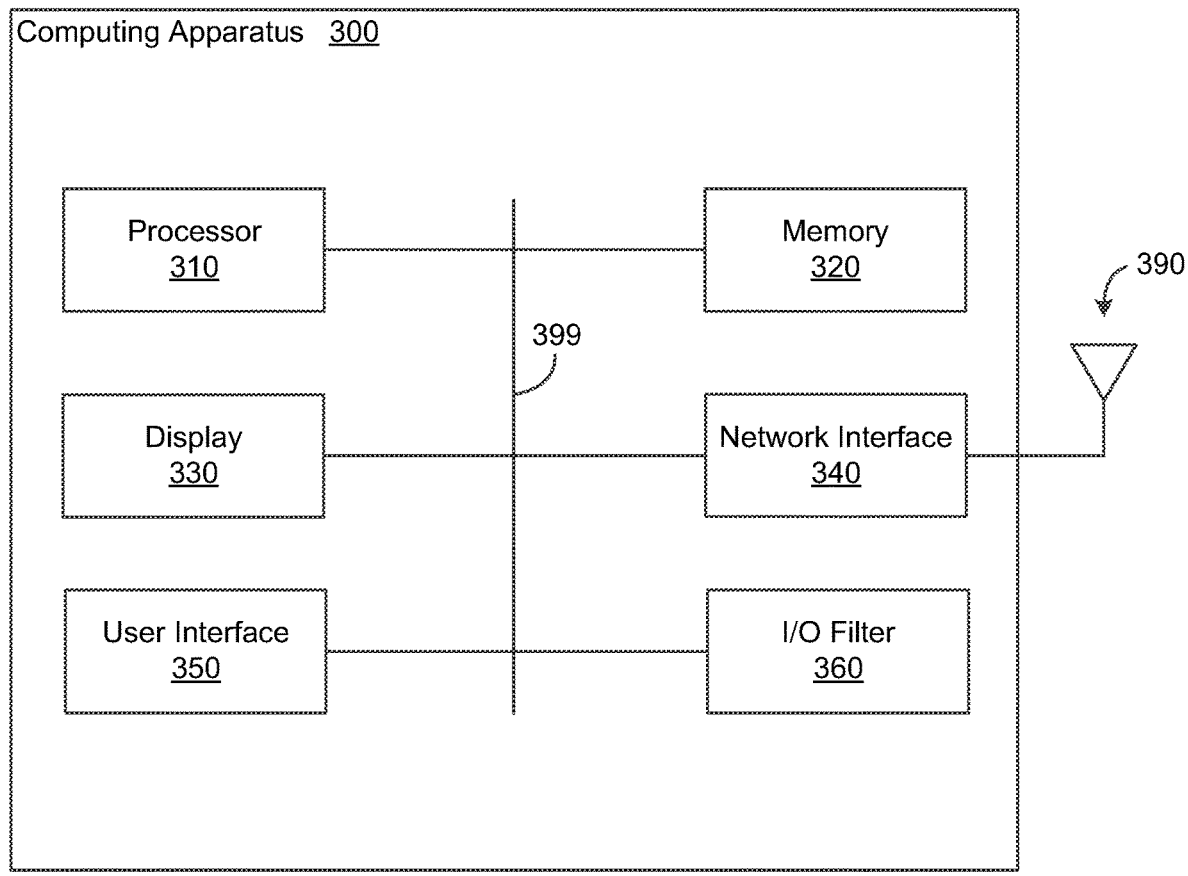
FIG. 3 depicts a block diagram of an example computing apparatus, in accordance with some example implementations.

FIG. 3 illustrates an example computing apparatus 300 which may be used to implement one or more of the described devices and/or components, in accordance with some example implementations. For example, at least a portion of the computing apparatus 300 may be used to implement at least a portion of the computing device 110, an apparatus providing the database 120, an apparatus providing the external software 130, the user access device 140, and/or the access device 165. The computing apparatus 300 may perform one or more of the processes described herein.

As illustrated, the computing apparatus 300 may include one or more processors such as processor 310 to execute instructions that may implement operations consistent with those described herein. The computing apparatus 300 may include memory 320 to store executable instructions and/or information. The memory 320 may include solid-state memory, solid-state disk drives, magnetic disk drives, or any other information storage device. In some aspects, the memory 320 may provide storage for at least a portion of a database (e.g., the database 120 or some other organization of data). The computing apparatus 300 may include a network interface 340 to a wired network or a wireless network, such as the network 160 of FIG. 1. In order to effectuate wireless communications, the network interface 340, for example, may utilize one or more antennas, such as antenna 390.

The computing apparatus 300 may include one or more user interface, such as user interface 350. The user interface 350 can include hardware or software interfaces, such as a keyboard, mouse, or other interface, some of which may include a touchscreen integrated with a display 330. The display 330 may be used to display information such as fillable and/or selectable web-based forms and/or fields, provide prompts to a user, receive user input, and/or the like. In various implementations, the user interface 350 can include one or more peripheral devices and/or the user interface 350 may be configured to communicate with these peripheral devices.

In some aspects, the user interface 350 may include one or more sensors and/or may include an interface to one or more sensors. The computing apparatus 300 may also comprise and input and output (I/O) filter 360, which can filter information received from sensors or other user interfaces, received and/or transmitted by the network interface 340, and/or the like. For example, signals detected through the antenna 390 can be passed through the I/O filter 360 for proper signal conditioning, and the filtered data may then be passed to the processor 310 for validation and/or processing. The computing apparatus 300 may be powered through the use of one or more power sources. As illustrated, one or more of the components of the apparatus 300 may communicate and/or receive power through a system bus 399.

FIG. 4 illustrates a flowchart of a method for encrypted identification and communication, in accordance with some example implementations. In various implementations, the method 400 (or at least a portion thereof) may be performed by one or more of the computing system 110, an apparatus providing the database 120, an apparatus providing the external software 130, one or more of the user access devices 140, the access device 165, the computing apparatus 300, other related apparatuses, and/or some portion thereof. In some aspects, the apparatus 300 may be regarded as a server.

Method 400 can start at operational block 410 where the apparatus 300, for example, can receive identification information identifying a user.

Method 400 can proceed to operational block 420 where the apparatus 300, for example, can validate an identity of the user based on comparing the identification information against first trusted information. In some aspects, the first trusted information can include credit history information. In some implementations, the first trusted information can be provided by a third party. The third party can be different from the entity providing the incident reporting service.

Method 400 can proceed to operational block 430 where the apparatus 300, for example, can provide an interface to the validated user to enter an electronic address associated with an accused entity based on the validating. In some implementations, the electronic address can include a web address, an email address, a phone number, a physical address, a GPS location, and/or the like. A physical address may correspond to a work address, a home address, or other physical address associated with an accused entity. In some aspects, the web address can be a link to a social media account associated with an accused person. In some aspects, the email address can be an email address used by the accused person.

Method 400 can proceed to operational block 440 where the apparatus 300, for example, can obtain additional addresses associated with the accused entity based on comparing the electronic address against second trusted information. In some implementations, obtaining the additional addresses can include obtaining the additional addresses from a database associating individuals with the additional addresses Method 400 can proceed to operational block 450 where the apparatus 300, for example, can verify, based on providing the additional addresses to the user, an identity of the accused entity.

Method 400 can proceed to operational block 460 where the apparatus 300, for example, can encrypt, when the identity of the accused entity is verified, the electronic address and the additional addresses to generate encrypted data. In some aspects, encrypting the electronic address and the additional addresses can be through the use of a one-way hash.

Method 400 can proceed to operational block 470 where the apparatus 300, for example, can compare the encrypted data against stored data to identify at least one matched user.

Method 400 can proceed to operational block 480 where the apparatus 300, for example, can generate, based on the comparing, a request for the at least one matched user to communicate with the user. In some implementations, the identity of the user is anonymous to the at least one matched user.

In some implementations, method 400 can additionally or alternatively involve the apparatus 300, for example, to provide, when the at least one matched user accepts the request, a communication interface to the user and the at least one matched user. In some implementations, the communication interface includes at least one of an anonymized chat room, an anonymized messaging service, and an anonymized email service.

In some implementations, method 400 can additionally or alternatively involve the apparatus 300, for example, providing an interface for a user to generate a report regarding potentially criminal activity. In some implementations, method 400 can additionally or alternatively generate a report comprising information about at least one of the user, the accused entity, an incident description, and the at least one matched user. In some implementations, method 400 can additionally or alternatively encrypt the report.

In some implementations, method 400 can additionally or alternatively involve the apparatus 300, for example, recording the report in a blockchain.

Performance of the method 400 and/or a portion thereof can allow for the verified and anonymous identification of an accused. Separately, performance of the method 400 and/or a portion thereof can allow for victims of a crime to anonymously connect with other victims by the same perpetrator. In some aspects, performance of the method 400 and/or a portion thereof can result in better (e.g. more likely, timely, and/or accurate) reporting of sexual violence crimes.

Although aspects are described herein with respect to sexual crimes, other implementations are possible. For example, the systems and methods described herein can be used to allow users to provide information on any activity, regardless of the nature of the activity, and/or allow users to connect based on the verified and/or validated identification of a person for any reason. For example, the systems and method described herein can be leveraged for positive or negative "feedback" (e.g., accusations, allegations, reports, reviews, and/or the like) on a person, company, product, service, and/or the like.

In some implementations, the system may allow a user to register with the system, verify the user's identity, verify whether the user actually utilized a product or service, provide an interface for the user to provide a review of the product or service, provide an interface for other users to view the review, and/or the like. A user can be determined to have actually utilized a product or service based on information obtained from a provider or the goods or services, an intermediary or broker providing the user with access to the goods or services, and/or the like. In related aspects, if a company desires to obtain feedback from existing employees only, then a user can be determined to be an employee of the company based on their email address, company records, and/or the like. In some aspects, based on the verification of individual users, the system may be able to prevent duplicate reviews, reviews from "robots" (e.g., programs designed to provide positive or negative feedback on goods or services), reviews from people who have not used a product or service or do not work at a company, and/or the like.

In some implementations, one or more of the communication interfaces described herein can be leveraged and/or adapted to connect patients or potential patients with similar health issues, such as terminally ill patients receiving or eligible to receive experimental drugs and/or treatments. Based on verifying that a user is receiving or is eligible to receive a specific drug and/or treatment, the system can allow the user to anonymously connect with at least one other user/patient that is currently or has previously received the drug and/or treatment.

At least some of the aspects described with respect to providing feedback can be the same as or at least similar to the aspects described herein with respect to reporting potentially criminal activity (e.g., user verification, receipt of information, transmission of information, encryption, anonymous messaging, and/or the like). Although the "system" is often referred to in the singular, multiple systems are possible with data potentially separated for each system (or at least a portion of the systems).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects associated with the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such phrases are intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." The use of the term "based on," above and in the claims is intended to mean "based at least in part on," such that a feature or element that is not recited is also permissible.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one processor; and
   at least one memory storing instructions which, when executed by the at least one processor, cause operations comprising:
   receiving identification information identifying a user;
   validating an identity of the user based on comparing the identification information against first trusted information;
   providing, based on the validating, a user interface to the user to enter an electronic address associated with an accused entity;
   obtaining, based on comparing the electronic address against second trusted information, additional addresses associated with the accused entity;
   verifying, based on providing the additional addresses to the user, an identity of the accused entity;
   hashing, when the identity of the accused entity is verified, the electronic address and the additional addresses with a hashing algorithm to produce a one-way hash, the one-way hash configured to be irreversible for identifying the accused entity;
   identifying at least one matched user in a plurality of stored data hashed with the hashing algorithm by comparing the one-way hash against the plurality of stored data hashed with the hashing algorithm; and
   generating, based on the comparing, a request for the at least one matched user to communicate with the user.

2. The system of claim 1, wherein the first trusted information comprises credit history information, and wherein the first trusted information is provided via a third party.

3. The system of claim 1, wherein the electronic address and the additional addresses each comprise at least one of an email address, a web address, a phone number, a physical address, a global positioning system (GPS) location, and a link to a social media account.

4. The system of claim 1, wherein the operations further comprise:
   obtaining the additional addresses from a database associating individuals with the additional addresses.

5. The system of claim 1, wherein the identity of the user is anonymous to the at least one matched user.

6. The system of claim 1, wherein the operations further comprise:
   providing, when the at least one matched user accepts the request, a communication interface to the user and the at least one matched user.

7. The system of claim 6, wherein the communication interface comprises:
   at least one of an anonymized chat room, an anonymized messaging service, and an anonymized email service.

8. The system of claim 1, wherein the operations further comprise:
   generating a report comprising user information about at least one of the user, the accused entity, an incident description, and the at least one matched user; and
   encrypting the report.

9. The system of claim 8, wherein the operations further comprise:
   recording the report in a blockchain.

10. A method, comprising:
    receiving identification information identifying a user;
    validating an identity of the user based on comparing the identification information against first trusted information;
    providing, based on the validating, an interface to the user to enter an electronic address associated with an accused entity;
    obtaining, based on comparing the electronic address against second trusted information, additional addresses associated with the accused entity;
    verifying, based on providing the additional addresses to the user, an identity of the accused entity;
    hashing, when the identity of the accused entity is verified, the electronic address and the additional addresses with a hashing algorithm to produce a one-way hash, the one-way hash configured to be irreversible for identifying the accused entity;
    identifying at least one matched user in a plurality of stored data hashed with the hashing algorithm by comparing the one-way hash against the plurality of stored data hashed with the hashing algorithm; and
    generating, based on the comparing, a request for the at least one matched user to communicate with the user.

11. The method of claim 10, wherein the first trusted information comprises credit history information, and wherein the first trusted information is provided via a third party.

12. The method of claim 10, wherein the electronic address and the additional addresses each comprise at least one of an email address, a web address, a phone number, a physical address, a global positioning system (GPS) location, and a link to a social media account.

13. The method of claim 10, further comprising:
    obtaining the additional addresses from a database associating individuals with the additional addresses.

14. The method of claim 10, wherein the identity of the user is anonymous to the at least one matched user.

15. The method of claim 10, further comprising:
    providing, when the at least one matched user accepts the request, a communication interface to the user and the at least one matched user.

16. The method of claim 15, wherein the communication interface comprises: at least one of an anonymized chat room, an anonymized messaging service, and an anonymized email service.

17. The method of claim 10, further comprising:
    generating a report comprising information about at least one of the user, the accused entity, an incident description, and the at least one matched user; and
    encrypting the report.

18. A non-transitory computer-readable medium storing instructions which when executed by at least one data processor, result in operations comprising:
    receiving identification information identifying a user;
    validating an identity of the user based on comparing the identification information against first trusted information;
    providing, based on the validating, an interface to the user to enter an electronic address associated with an accused entity;
    obtaining, based on comparing the electronic address against second trusted information, additional addresses associated with the accused entity;
    verifying, based on providing the additional addresses to the user, an identity of the accused entity;
    hashing, when the identity of the accused entity is verified, the electronic address and the additional addresses with a hashing algorithm to produce a one-way hash, the one-way hash configured to be irreversible for identifying the accused entity;

identifying at least one matched user in a plurality of stored data hashed with the hashing algorithm by comparing the one-way hash against the plurality of stored data hashed with the hashing algorithm; and generating, based on the comparing, a request for the at least one matched user to communicate with the user.

\* \* \* \* \*